UNITED STATES PATENT OFFICE.

GOTTLOB STEINEMANN, OF JOLIET, ILLINOIS.

IMPROVEMENT IN ROOFING COMPOSITIONS.

Specification forming part of Letters Patent No. 149,077, dated March 31, 1874; reissue No. 5,976, dated July 21, 1874; application filed May 19, 1874.

*To all whom it may concern:*

Be it known that I, GOTTLOB STEINEMANN, of the city of Joliet, in Will county and State of Illinois, have invented a certain Compound called Composition Roofing, of which the following is a specification:

This invention relates to the use and combination of certain ingredients combined in the proportions and manner hereinafter described, for the purpose of making a composition roofing for buildings, &c.

In order to accomplish the result of making said roofing, I use coal-tar, sulphur, brown sand, resin, vitriol, bees-wax, and cement.

To enable others to make this roofing, I take six gallons of coal-tar, four pounds of resin, four pounds of vitriol, four pounds of sulphur, and two pounds of bees-wax. After the same are boiled down together I add one barrel of common sand and one peck of common cement, and it is then ready to spread on the roof.

The bees-wax and resin give the roofing some elasticity, while the vitriol, sulphur, and cement give it the flinty hardness.

This roofing is intended for roofs, floors, sidewalks, &c.

Having thus described my invention, what I claim as new, and desire to secure by Letters Patent, is as follows:

The combination of the ingredients described, in the manner and for the purpose substantially as set forth.

GOTTLOB STEINEMANN.

Witnesses:
WM. E. HENRY,
THOS. H. HUTCHINS.